US006575346B2

United States Patent
Fenjac et al.

(10) Patent No.: US 6,575,346 B2
(45) Date of Patent: Jun. 10, 2003

(54) TORQUE CAPSTAN THAT IMPROVES REVERSE OSCILLATING LAY (ROL) CONSISTENCY DURING AN OPTICAL FIBER CABLE MANUFACTURING PROCESS

(75) Inventors: Slobodan F. Fenjac, Marietta, GA (US); Kelly L. Johnson, Roswell, GA (US); Wayne M. Newton, Lilburn, GA (US); Eugene R. Rusiecki, Alpharetta, GA (US); Mark I. Shmukler, Tucker, GA (US); Donald D. Vargasreyes, Norcross, GA (US)

(73) Assignee: Fitel USA Corporation, Norcross, GA (US)

( * ) Notice: Subject to any disclaimer, the term of this patent is extended or adjusted under 35 U.S.C. 154(b) by 0 days.

(21) Appl. No.: 09/833,320

(22) Filed: Apr. 12, 2001

(65) Prior Publication Data

US 2002/0148873 A1 Oct. 17, 2002

(51) Int. Cl.$^7$ .......................... B65H 23/18; B65H 20/16
(52) U.S. Cl. .......................... 226/42; 226/38; 226/172; 242/418.1
(58) Field of Search .............................. 226/42, 44, 38, 226/172; 242/418.1

(56) References Cited

U.S. PATENT DOCUMENTS

| | | | | |
|---|---|---|---|---|
| 2,046,997 A | * | 7/1936 | Boddy et al. | 226/172 X |
| 2,053,260 A | * | 9/1936 | Blashill | 226/172 X |
| 2,212,132 A | * | 8/1940 | Shear | 226/172 X |
| 2,884,120 A | * | 4/1959 | Bruestle | 226/172 |
| 3,024,956 A | * | 3/1962 | Gretter | 226/172 X |
| 3,552,308 A | * | 1/1971 | Minehart | 226/42 X |
| 3,946,918 A | * | 3/1976 | Babbin et al. | 226/172 X |
| 4,508,251 A | * | 4/1985 | Harada et al. | 226/172 X |
| 5,009,353 A | * | 4/1991 | Alquist | 226/172 |
| 5,315,813 A | * | 5/1994 | Ito et al. | 57/6 |
| 5,826,419 A | * | 10/1998 | Shelander et al. | 57/6 |

FOREIGN PATENT DOCUMENTS

DE      40 09 862 A1 * 10/1991 ............. 226/172 X

* cited by examiner

Primary Examiner—Kathy Matecki
Assistant Examiner—Minh-Chau Pham
(74) Attorney, Agent, or Firm—Thomas, Kayden, Horstemeyer & Risley, LLP (57) ABSTRACT

A torque capstan is provided for use in an optical fiber cable manufacturing process which enables reverse oscillating lay (ROL) length to be maintained. The torque capstan comprises a first portion having at least two pulleys rotationally mounted thereon, a second portion having at least two pulleys rotationally mounted thereon, and first and second drive belts mounted on the pulleys of the first and second capstan portions, respectively. Rotational motion is imparted to the first and/or second drive belts through a drive system that is coupled to a drive pulley of at least one of the first and second capstan portions. Rotation of at least one of the drive pulley(s) causes the respective drive belt to rotate in a direction parallel to, or substantially parallel to, a direction in which an optical fiber cable being manufactured in the optical fiber cable manufacturing process is being pulled. Contact between the drive belts causes the drive belts to rotate in the same direction. At least one of the first and second drive belts has a longitudinal groove formed therein that is parallel to, or substantially parallel to, the direction in which the optical fiber cable is being pulled. The belts grip and pull/push the cable in such a way that the ROL length is maintained over a length of the optical fiber cable, thus improving the quality of the manufactured optical fiber cables.

18 Claims, 8 Drawing Sheets

TORQUE CAPSTAN THAT IMPROVES REVERSE OSCILLATING LAY (ROL) CONSISTENCY DURING AN OPTICAL FIBER CABLE MANUFACTURING PROCESS

TECHNICAL FIELD OF THE INVENTION

The present invention generally relates to manufacturing optical fiber cables and, more particularly, to a torque capstan that improves the consistency of the reverse oscillating lay of the cables during the manufacturing process, thereby improving the quality of the manufactured cables.

BACKGROUND OF THE INVENTION

It is known in the optical fiber cable manufacturing industry that reverse oscillating lay (ROL) inconsistency during the cable manufacturing process, particularly in regard to high-fiber-count (HFC) cables, results in non-uniform distribution of the mechanical load and stress on the cable throughout its entire length. This non-uniform distribution of mechanical load/stress on the cable during the manufacturing process often results in the cable exhibiting high optical loss during mechanical and environmental qualification tests, which is regarded as a failure in the cable.

Figure 1:
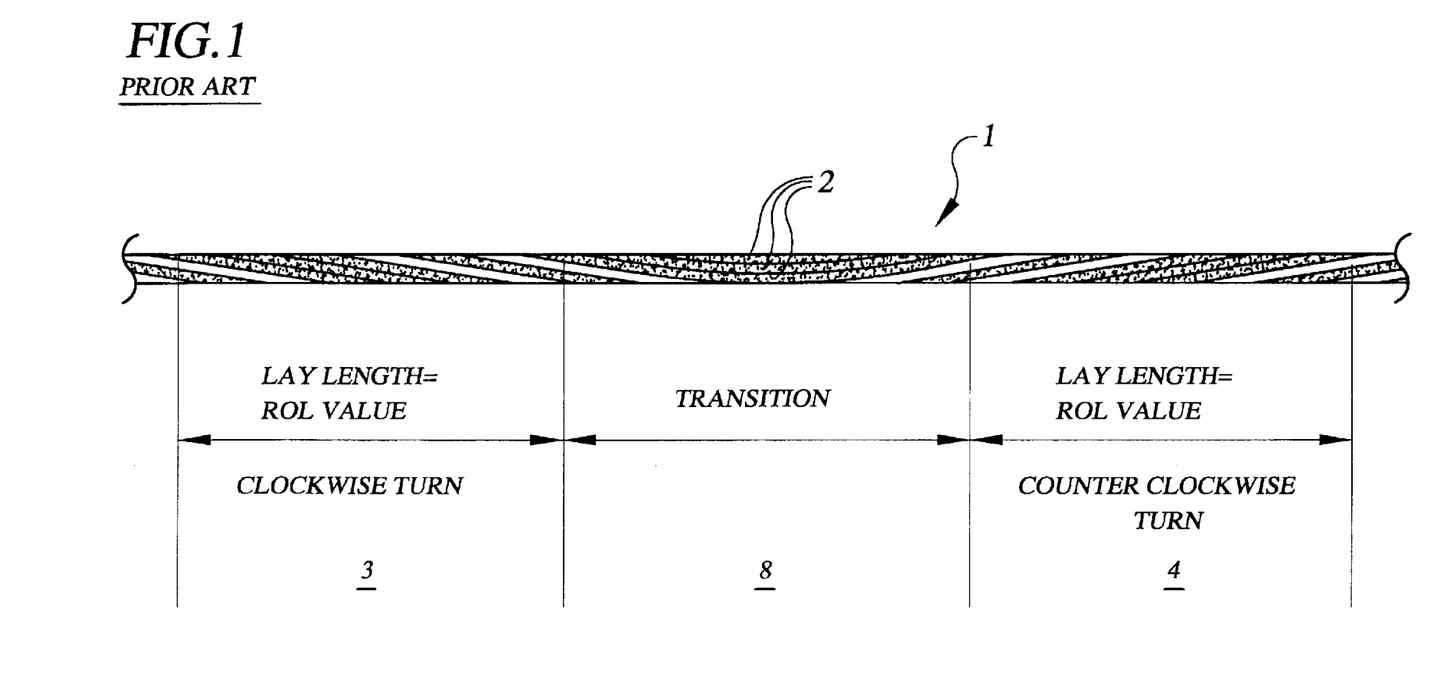
FIG. 1 is a pictorial representation of a high fiber count (HFC) cable and the manner in which it is twisted as it is pulled through a typical reverse oscillating lay (ROL) machine.
Figure 2:
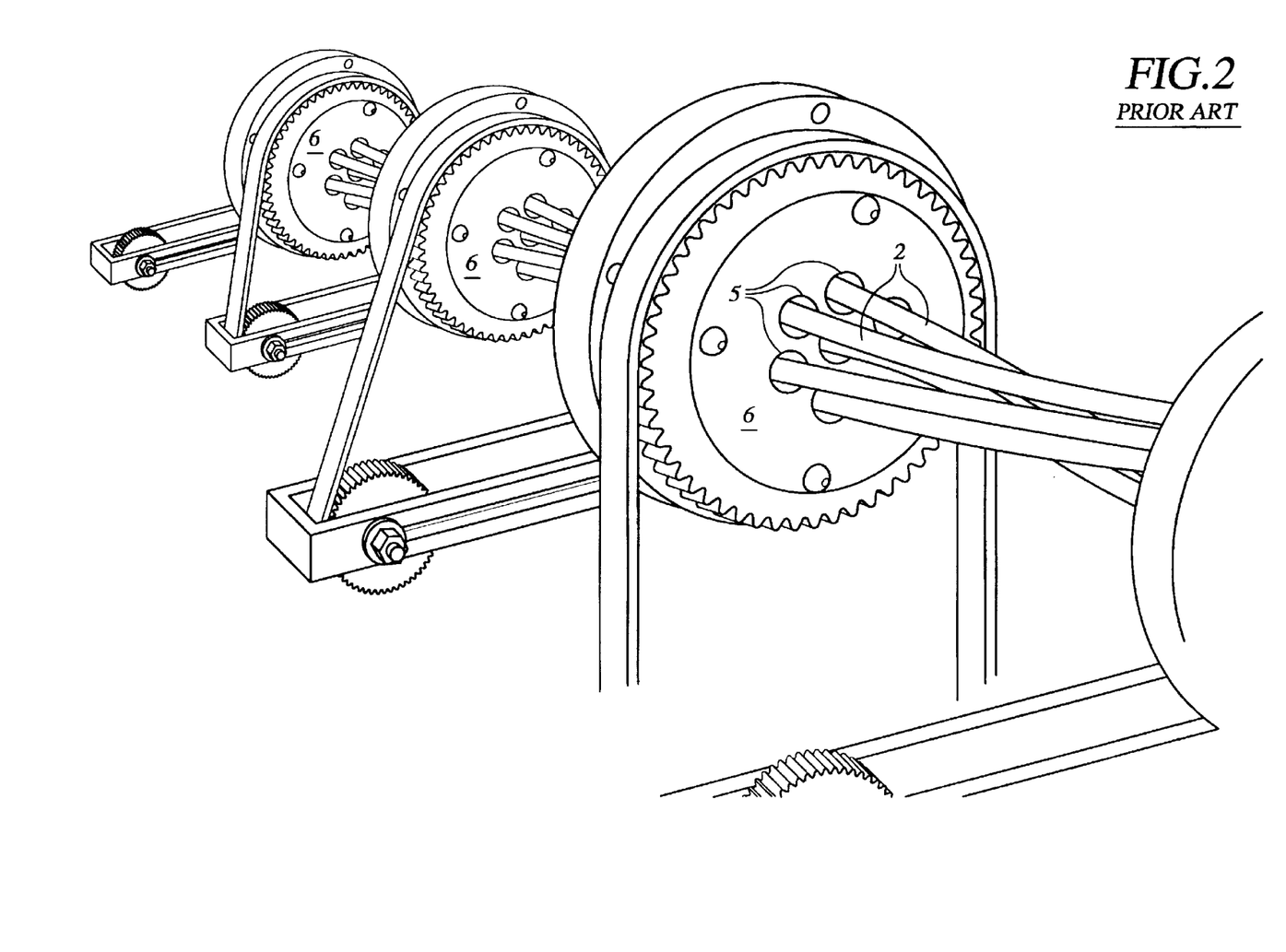
FIG. 2 is photograph of a portion of an ROL machine that illustrates the manner in which plates of the ROL machine twist a HFC cable as it is pulled through the ROL machine.

FIG. 1 is a graphical representation illustrating the manner in which a HFC cable 1 twists during a typical HFC cable manufacturing process. A HFC cable 1 is a cable that comprises a plurality of subunits 2, typically three to twelve, each of which comprises a plurality of coated optical fibers (not shown). During the manufacturing process, a reverse oscillating lay (ROL) machine is used to create the proper amount of ROL in the HFC cable. A portion of an ROL machine used for this purpose is shown in FIG. 2. During the HFC cable manufacturing process, the subunits 2 of the HFC cable are pulled through holes 5 formed in a series of reverse oscillating plates 6 as adjacent reverse oscillating plates are rotated in the same direction, but at incrementally increasing angles of rotation. At a particular point during the rotations of any two adjacent plates 6, a predetermined amount of twist is added to the core of the HFC cable. At this point, the direction in which each of the plates is being rotated reverses, and the plates rotate oppositely until the same amount of twist has been added to the core of the HFC cable in the opposite direction. The twisting of the HFC cable in this manner as it is being pulled is intended to equalize the distribution of stress on the subunits over the length of the cable.

With reference again to FIG. 1, the lay length is a length of a complete 360° turn of the cable core in either the clockwise 3 or counterclockwise 4 directions. Once the apex is reached in either direction, the adjacent plates 6 reverse their directions of rotation and a transition 5 occurs in the cable 1 when the twisting direction changes. The ROL value corresponds to the desired lay length that is typically programmed into a control system of the ROL machine. Ideally, the measured lay length at any point during the manufacturing process should be equal to the programmed ROL value.

In current HFC cable manufacturing processes, after the cable leaves the ROL machine, it is pulled through a powder machine (for certain cable types), a set of torsion rolls that helps to keep subunits 2 together, and an extruder (not shown), which extrudes a material over the sub-units to form the outer jacket of the cable. As the HFC cable leaves the extruder, it is pulled through, respectively, a water trough and a main capstan. The water trough cools and solidifies the extruded material to form the outer jacket of the HFC cable. The main capstan provides the pulling force and controls the speed at which the cable is pulled along the manufacturing line.

One of the problems associated with known HFC manufacturing techniques is that they often do not ensure that the ROL is consistently maintained (i.e., that the programmed ROL value=the measured lay length), which causes non-uniform stress distribution in the cable. This often results in the cable failing during testing or usage due to high optical loss.

SUMMARY OF THE INVENTION

Accordingly, a need exists for a way of ensuring that the ROL is consistently maintained during the manufacturing process, thereby decreasing or eliminating cable failures that often result from ROL inconsistency. The present invention provides a torque capstan for use in an optical fiber cable manufacturing process which enables reverse oscillating lay (ROL) length to be maintained. The torque capstan comprises a first portion having at least two pulleys rotationally mounted thereon, a second portion having at least two pulleys rotationally mounted thereon, and first and second drive belts mounted on the pulleys of the first and second capstan portions, respectively. Rotational motion is imparted to the first and/or second drive belts through a drive system that is coupled to a drive pulley of at least one of the first and second capstan portions. Rotation of the drive pulley(s) causes the respective drive belt to rotate in a direction parallel to, or substantially parallel to, a direction in which an optical fiber cable being manufactured in the optical fiber cable manufacturing process is being pulled. Contact between the drive belts causes the drive belts to rotate in the same direction. At least one of the first and second drive belts has a longitudinal groove formed therein that is parallel to, or substantially parallel to, the direction in which the optical fiber cable is being pulled. The belts grip the cable in such a way that the ROL length is maintained over a length of the optical fiber cable, thus improving the quality of the manufactured optical fiber cables.

In accordance with one embodiment, each of the upper and lower drive belts of the capstan have the grooves formed in them longitudinally with respect to the direction in which the cable is pulled during the cable manufacturing process. Each of the grooves has a cross-sectional shape designed such that, when vertical force is placed on each of the drive belts in opposite directions, the grooves of the drive belts are pushed towards each other and about the cable. The grooves together form an annulus opening that is adapted to grip the cable in such a way that the subunits are properly kept together and lay lengths in the cable, which are produced by the ROL machine, are maintained, or substantially maintained, before cable enters the extruder.

In accordance with one embodiment, the capstan is utilized in conjunction with a capstan feedback control system that controls the torque placed on the cable by the capstan in order to offset excessive back-tension produced by the ROL machine and by a subunits payoff machine. In accordance with the present invention, it has been determined through experimentation and analysis that the excessive back-tension placed on HFC cables during the manufacturing process, as well as significant periodical fluctuations of the tension force amplitude during the manufacturing process, result in ROL inconsistency and ineffectiveness in lay capturing. By offsetting the excessive back-tension produced by the ROL and payoff machines in accordance with feedback signals relating to the amount of tension being placed on the cable, excessive back-tension and significant periodical fluctuations of the tension force amplitude are reduced or eliminated, thus improving ROL consistency and lay capturing. These features of the present invention, alone and/or in combination, result in an overall improvement in the quality of the manufactured cables.

These and other features and advantages of the present invention will become apparent from the following description, drawings and claims.

DETAILED DESCRIPTION OF THE INVENTION

Figure 3:
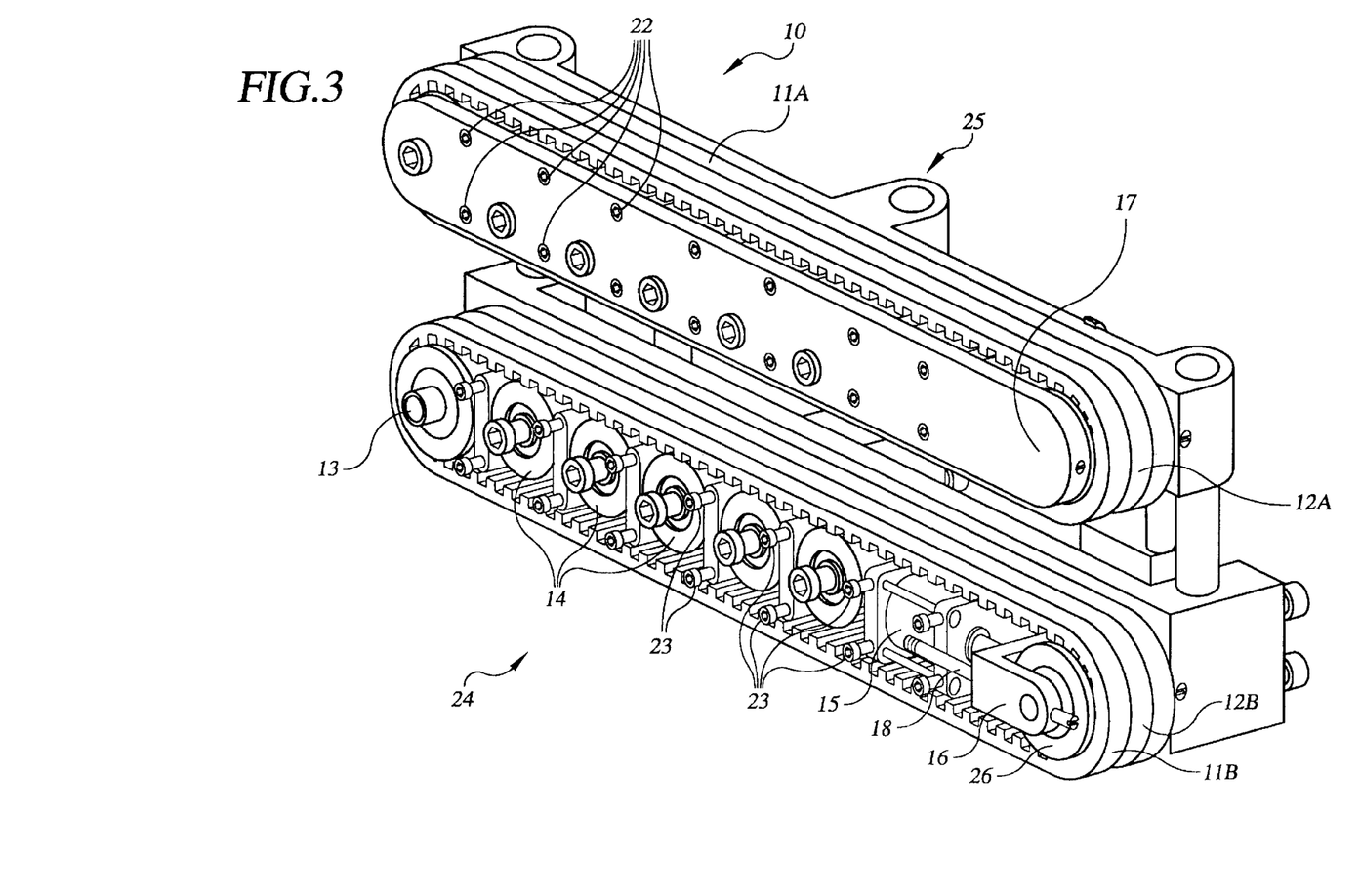
FIG. 3 is an isometric view of the capstan of the present invention in accordance with one embodiment.

In accordance with the present invention, a torque capstan has been developed that helps maintain the ROL turn lengths created by an ROL machine, such as that shown in FIG. 2, during the cable manufacturing process. FIG. 3 is an isometric view of the preferred capstan 10. In accordance with the preferred embodiment, both the upper and lower drive belts 11A and 11B each have half-round grooves 12A and 12B, respectively, formed in them. The drive belts 11A and 11B preferably are comprised of a high-friction neoprene material and are precisely designed and machined such that the grooves 12A, 12B formed in the belts are half-round. The grooves 12A, 12B are designed such that the core of the cable (not shown) fits tightly within the grooves 12A, 12B.

The Capstan 10 is a custom designed unit, which preferably is controlled by a feedback control system to compensate for excessive fluctuating back-tension. The capstan 10 preferably comprises a drive pulley 13 that is adapted to be coupled to a servomotor (FIG. 6) that is connected to a capstan feedback control system (FIG. 6) that changes the amount of torque applied by the capstan 10 in order to compensate for excess back-tension. FIG. 3 illustrates the inside of the lower portion 24 of the capstan 10. The lower portion 24 of the capstan 10 preferably comprises the drive pulley 13, a plurality of idler pulleys 14, a driven pulley 26, a lower drive belt 11B, a pneumatic cylinder 15 and a yoke 16 that is coupled to the cylinder 15 and to the driven pulley 26 via a guide shaft 18. The upper portion 25 of the capstan 10 preferably is identical, or substantially identical, to the lower portion 24 of the capstan 10, except that the upper portion 25 preferably does not comprise a drive pulley. The upper portion 25 of the capstan 10 is shown with the face plate 17 mounted thereon so that the components that are identical, or substantially identical, to the components shown in the lower portion 24 of the capstan 10 are not visible. The lower portion 24 will likewise have a face plate (not shown) mounted thereto. The face plate 17 (and the lower portion face plate that is not shown) is mounted to the capstan 10 via fastening mechanisms, such as, for example, openings 22 formed in the face plate 17 that mate with pins (not shown) in the upper portion 25 identical to pins 23 shown in the lower portion 24 of the capstan 10. Those skilled in the art will understand that the manner in which the capstan 10 is physically assembled is not limited to any particular design or configuration.

Figure 4:
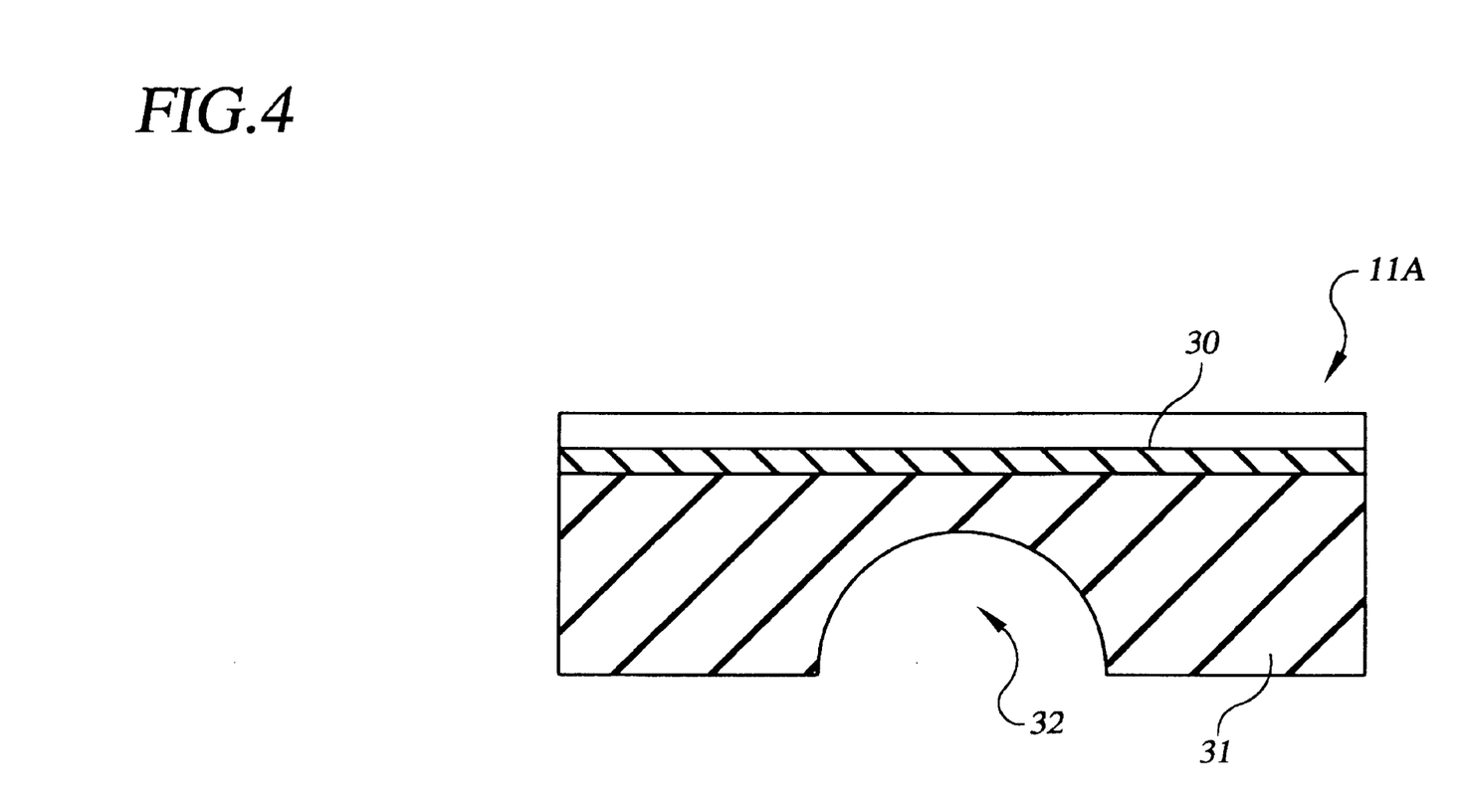
FIG. 4 is a cross-sectional view of the upper drive belt of the capstan shown in FIG. 3 in accordance with one embodiment.

FIG. 4 illustrates an example embodiment of the belt used for the lower and/or upper portions 24, 25 of the capstan 10. The upper belt 11A is shown in FIG. 4. Preferably the belt 11A is comprised of a timing belt 30 having a high-friction material 31 attached thereto. The manner in which the timing belt 30 and the high-friction material 31 are attached is not critical. Preferably, the high-friction material 31 is designed and machined precisely with a half-round, or half-circular, opening 32 formed therein. The dimensions of the timing belt 30, the high-friction material 31 and the opening 32 are not critical, but should be selected/calculated according to the specific application in which the belt 11A is implemented. Preferably, the dimensions of the opening 32 are such that the opening tightly grips the cable being manufactured in a friction-fit manner in such a way that the lay length produced by the ROL machine (FIG. 6) is maintained. It should also be noted that the shape of the opening 32 formed in the belt is not critical. The shape of the opening 32 can be varied and different types of openings (e.g., square, triangular, etc.) can be used provided the necessary friction-fit can be achieved between the opening 32 and the cable being manufactured. Those skilled in the art will understand, in view of the discussion provided herein, the manner in which such modifications can be made to accomplish the goals of the present invention.

Figure 5:
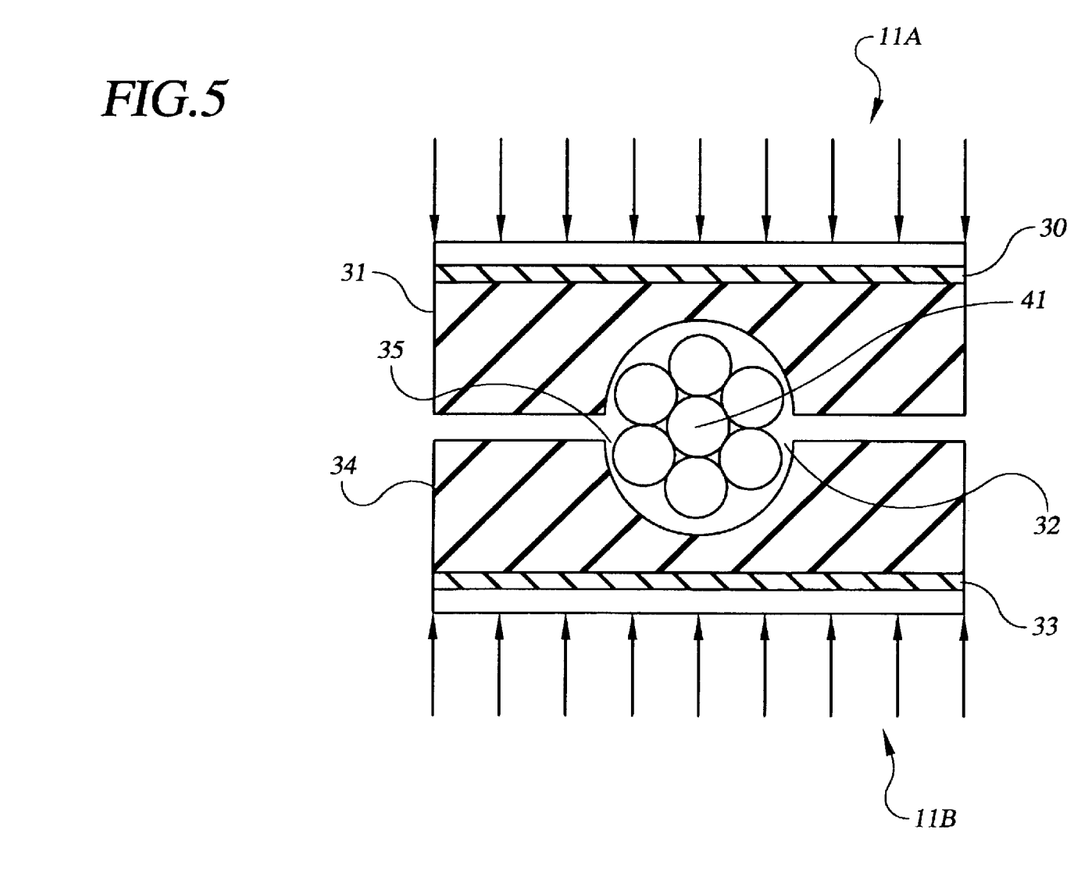
FIG. 5 is a cross-sectional view of the upper and lower drive belts of the capstan shown in FIG. 3 in accordance with one embodiment, which illustrates the manner in which the upper and lower drive belts having grooves formed therein grip a cable as it is being manufactured.

FIG. 5 illustrates the manner in which the upper belt 11A and the lower belt 11B, which is shown for exemplary purposes as being identical to the upper belt 11A, grip the subunits of a cable, such as that shown in FIG. 1, as the cable enters the torque capstan 10. In FIG. 5, the belt 11B is shown as comprising a timing belt 33 and a high-friction material 34. The opening formed in the belt 11B is designated by the numeral 35. A downward force applied by the capstan 10 on the upper belt 11A and an upward force applied by the capstan 10 on the lower belt 11B, in conjunction with the high-friction material 31 and 34 of the belts 11A and 11B, respectively, grip the cable within the openings 32 and 35, respectively, to create the desired friction fit needed to transfer torque/force from the belts 11A and 11B to the cable to reduce the excess back-tension created by the ROL machine. Preferably, the high-friction materials 31 and 34 are formed of neoprene, although they are not limited to any particular material.

During the manufacturing process, the core of the cable leaves the ROL machine, passes through a powder machine (not shown (for certain cable types only)), and passes through a slave plate (not shown). The slave plate repeats the rotation of the last plate of the ROL machine. The cable passes through a closing die (not shown) and then into the capstan 10. The belts 11A, 11B are pressed toward each other and the cable is "grabbed" by the belts 11A, 11B in the annulus opening formed by the grooves (FIG. 3, 12A and 12B) when the belts 11A and 11B are pressed together in the manner shown in FIG. 5. This tight friction fit keeps the sub-units 41 together and helps keep the ROL turn lengths unchanged before the core of the cable enters the extruder.

Figure 6:
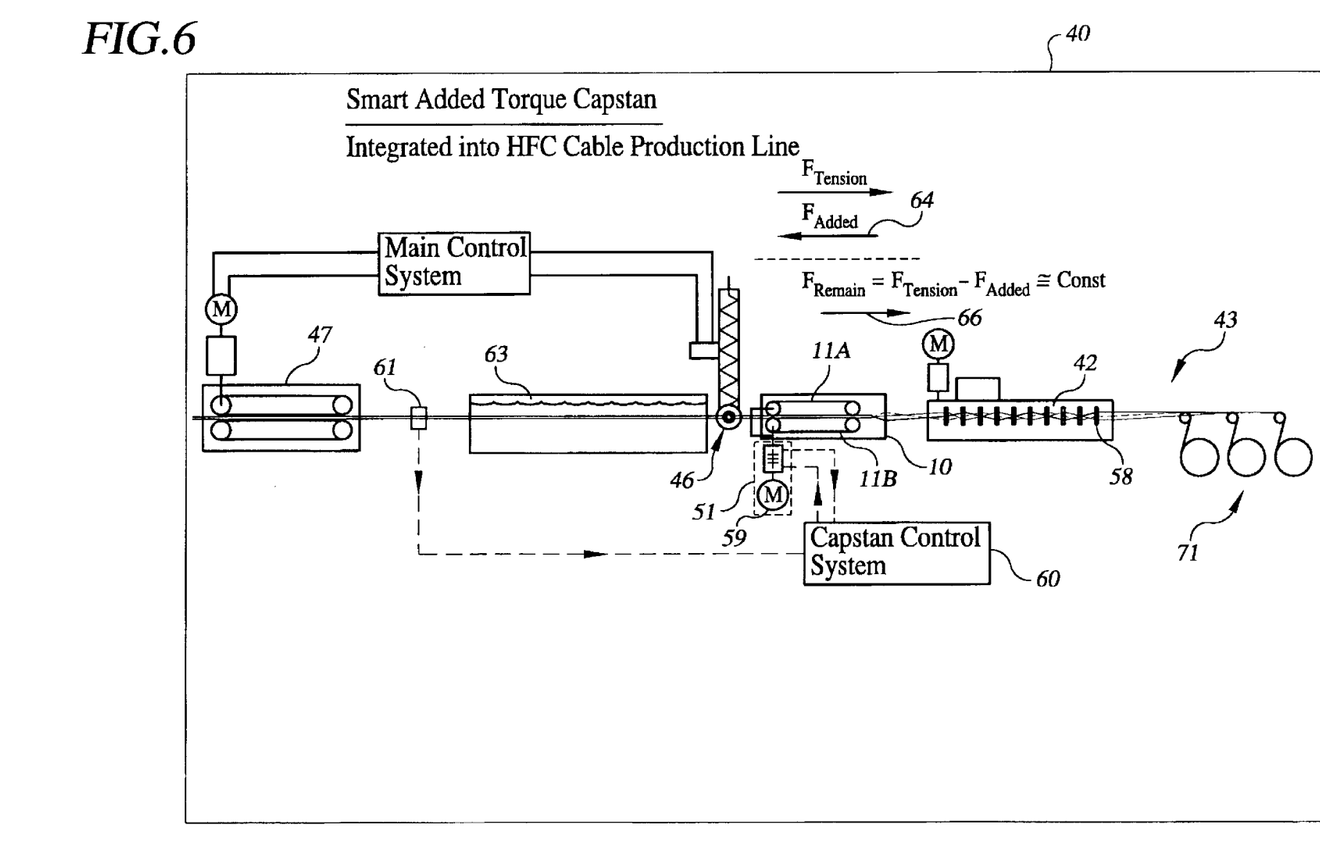
FIG. 6 is a system diagram illustrating the manner in which the capstan shown in FIG. 3 can be utilized in conjunction with a capstan feedback control system to reduce excessive back-tension produced by an ROL machine that may cause ROL inconsistency and result in cable failures.

FIG. 6 is a block diagram of a manufacturing system 40 that is preferably utilized with the capstan 10 of the present invention to ensure that the excessive back-tension created by the ROL machine is accurately offset, thereby further ensuring that the desired ROL turn lengths are maintained during the entire fabrication process. To accomplish this, the capstan 10 of the present invention is used in conjunction with a capstan feedback control system, which is represented by block 60. The manufacturing system 40 causes a pushing force/torque (hereinafter referred to as "pushing force") to be generated on a HFC cable 43 being manufactured, which minimizes or eliminates undesirable excessive back-tension in the section of the cable between the extruder 46 and the main capstan 47. The amount of back-tension placed on the cable 43 periodically fluctuates due to the relative orientation of each rotating plate of the ROL machine 42. Also, some minimum optimum amount of tension should be maintained on the cable 41 as it enters the extruder 46. Therefore, one of the goals of this embodiment of the present invention is to precisely control the amount of the pushing force generated such that the remaining amount of back-tension is kept constant at a certain minimum desired, or required, level.

In order to perform these functions, the capstan 10 is driven by an electrical programmable drive 51, which is controlled by the capstan feedback control system 60. The horizontal pneumatic cylinders (FIG. 3, 15) and vertical cylinders (not shown) of the capstan 10 are controlled by the capstan feedback control system 60, or optionally, with a Line Operator interference provided from a control panel operated by a Line Operator. The pneumatic cylinders provide all linear motions of the upper and lower drive belts 11A and 11B, respectively, such as, for example, belt stretching, vertical belt motion and clamping the core of the cable. A servomotor 59 generates a certain amount of torque and transforms the torque into the pushing force by controlling the rotation of the lower drive belt 11B of the capstan 10. This extra force directed toward the extruder 46 compensates for the fluctuating excessive back-tension created by the ROL machine 42 and by the PayOff machine 71. Feedback signals output from the capstan feedback control system 60 to the electrical programmable drive 51 cause the drive 51 to change the amount of torque generated by the servomotor 59. In turn, this changes the value of the additional pushing force provided at the belts 11A and 11B and applied directly to the core of the cable, thus equalizing the back-tension.

It should be noted that there are many ways to control the operation of the capstan 10 to cause it to produce the amount of extra torque needed to equalize the fluctuating back-tension. The present invention is not limited in any way to any particular configuration. Those skilled in the art will understand, in view of the discussion provided herein, that there are many ways in which the capstan and drive could be constructed to achieve the objectives of the present invention.

The capstan feedback control system 60 comprises a sensor 61 that preferably is located on the opposite side of the water trough 63 from the capstan 10. The sensor 61 senses the tension in the cable and generates signals that are utilized by the capstan feedback control system 60 to control the drive 51, which, in turn, causes the capstan 10 to generate the proper amount of additional torque in the direction indicated by arrow 64 to maintain the back-tension at a constant, or substantially constant, level represented by arrow 66 ($F_{remain}$). Torque generated by the servomotor 59 creates a horizontal pushing force that is applied to the core of the cable 41 and directed toward the extruder 46 and water trough 63. This pushing force compensates for, or neutralizes, the undesirable back-tension created by the ROL machine 42 and Sub-unit PayOff machine 71.

Furthermore, the feedback control system 60 of the capstan 10 preferably also constantly monitors the motion speed of the belts at the main capstan 47. The control system 60 then controls the speed of the belts 11A, 11B of the capstan 10 in a such way that the speed of the capstan 10 is always related to the speed of the main capstan 47 and, ideally, matches it.

Figure 7:
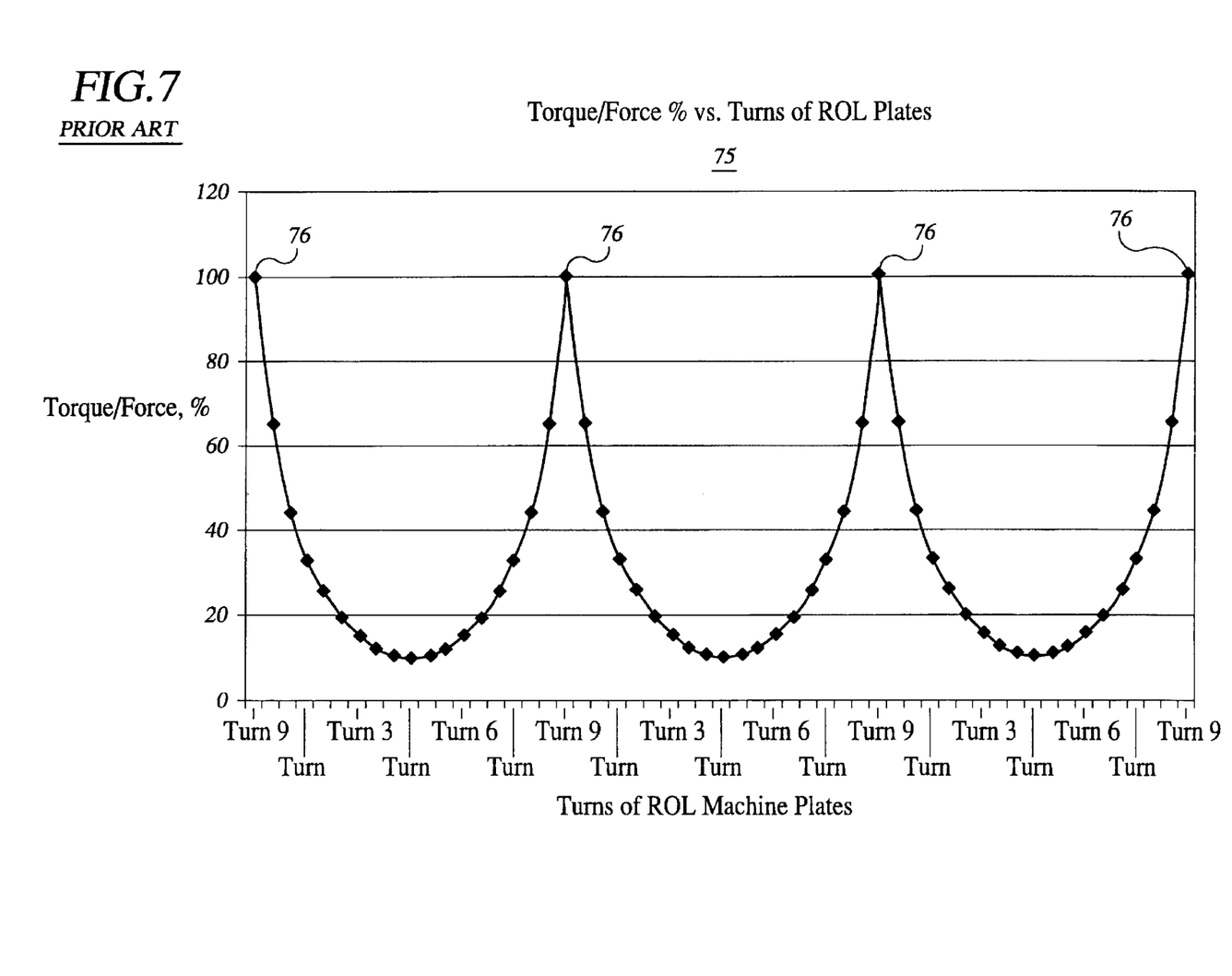
FIG. 7 is a graph illustrating the relationship between the amount of torque/back-tension force (expressed as percentage) placed on an HFC cable versus the number of turns of ROL plates of an ROL machine when the capstan shown in FIG. 3 and the feedback system shown in FIG. 6 are not implemented.
Figure 8:
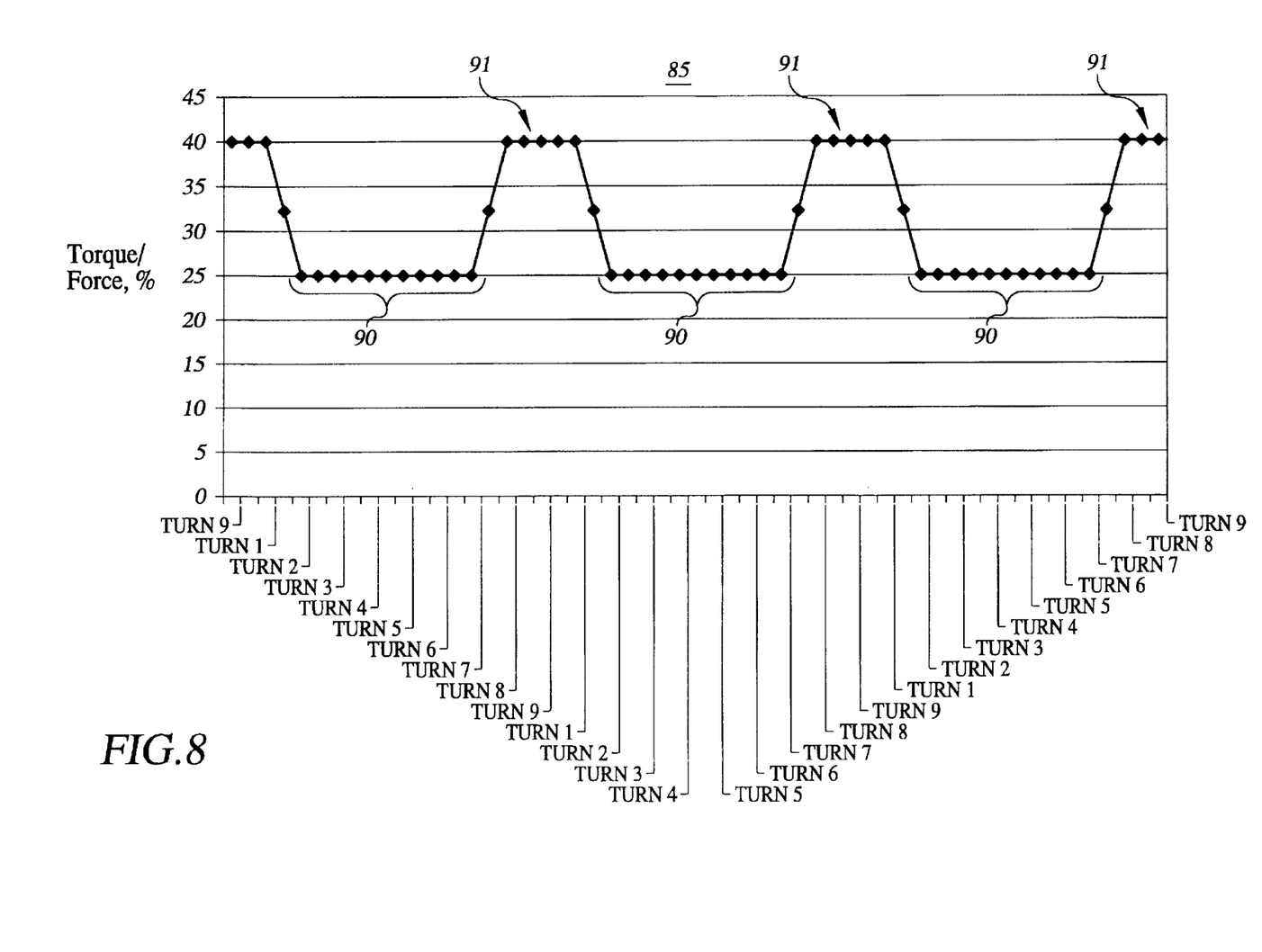
FIG. 8 is a graph illustrating the relationship between the amount of torque/back-tension force (expressed as percentage) placed on an HFC cable versus the number of turns of ROL plates of an ROL machine when the capstan shown in FIG. 3 and the feedback system shown in FIG. 6 are incorporated into the cable manufacturing process.

FIG. 7 is a graph 75 illustrating the relationship between the amount of back-tension force placed on the cable versus the number of turns of the ROL plates, such as those shown in FIG. 2, when the capstan 10 of the present invention and the feedback system shown in FIG. 6 are not implemented. The back-tension force is greatest at the apexes, which are designated by the numeral 76. In contrast, FIG. 8 is a graph 85 that illustrates the results of utilizing the capstan 10 and capstan feedback control system 60 in an HFC manufacturing system such as that shown in FIG. 6. The result is a significant reduction in excess back-tension, which, in turn, improves ROL consistency and results in higher cable quality. A comparison of FIGS. 7 and 8 shows that, for the same number of turns of the ROL plates (horizontal axes), the back-tension (vertical axes) calculated in terms of torque/force percentage is significantly less overall, and that periodical fluctuations of the tension force amplitude are significantly reduced. The overall reduction in back-tension is evident from the fact that the maximum back tension in terms of torque/force % is 40 in the graph 85 of FIG. 8, as opposed to 100 in the graph 75 of FIG. 7. The reduction in periodical fluctuations of the tension force amplitude is evident from the fact that the maximum torque/force % differential at any given time is 15, and from the fact that the lower and upper apexes 90 and 91, respectively, are constant over a number of turns.

With reference again to FIG. 6, the sensor 61 preferably is comprised of a load cell and supporting structure. The sensor 61 constantly monitors the amount of remaining tension (i.e., tension remaining after offset) in the cable 43. The major component of the back-tension is due to the ROL machine 42 and changes periodically as a result of the relational orientation of the ROL plates 58. The sensor 61 detects any deviation in the tension amplitude from the desired value. As stated above, the sensor 61 sends the corresponding signal to the capstan feedback control system 60, which, if necessary, changes the amount of torque generated by the servomotor 59, thus forcing the tension in the cable to remain constant, or substantially constant, and at the required level.

It should be noted that although the present invention has been described with respect to particular embodiments, the present invention is not limited to the embodiments described herein. Those skilled in the art will understand, in view of the discussion provided herein, that modifications can be made to the embodiments described that are within the scope of the present invention. For example, there are many ways to create a suitable feedback system to control the capstan 10. Likewise, the are many ways to construct a capstan 10 that is suitable for the uses described above with reference to FIGS. 3–6. Similarly, there are many different types of sensors that are suitable for performing the functions performed by the sensor 61.

What is claimed is:

1. A torque capstan for use in an optical fiber cable manufacturing system, the system including a main capstan for pulling an optical fiber cable through the system in a direction, the torque capstan comprising:

a first portion, the first portion having at least two pulleys rotationally mounted thereon;

a second portion, the second portion having at least two pulleys rotationally mounted thereon;

a first drive belt mounted on the pulleys of said first portion, the first drive belt having a longitudinal groove formed therein that is configured to grip a portion of the optical fiber cable, the longitudinal groove being substantially parallel to a direction in which the optical fiber cable is being pulled during an optical fiber cable manufacturing process;

a second drive belt mounted on the pulleys of said second portion, a portion of the first drive belt being in contact with a portion of the second drive belt during the optical fiber cable manufacturing process such that rotation of one of the drive belts in said direction in which the optical fiber cable is being pulled causes the other drive belt to rotate in said direction;

a feedback system; and wherein said torque capstan is configured to apply an additional force substantially parallel to said direction in which the fiber is being pulled based upon an input from said feedback system.

2. The torque capstan of claim 1, wherein the second drive belt has a longitudinal groove formed therein that is configured to grip a portion of the optical fiber cable, the longitudinal groove formed in the second drive belt being substantially parallel to said direction in which the optical fiber cable is being pulled, the grooves formed in the first and second belts being substantially longitudinally aligned.

3. The torque of claim 2, wherein the grooves are formed in respective layers of high-friction material comprised by the first and second belts.

4. The torque capstan of claim 1, wherein the longitudinal groove is substantially semicircular in shape and is dimensioned to grip the optical fiber cable being manufactured in a friction fit.

5. The torque capstan of claim 1, wherein the second drive belt has a longitudinal groove formed therein, the longitudinal groove formed in the second drive belt being substantially parallel to said direction in which the optical fiber cable is being pulled, the grooves formed in the first and second belts being substantially longitudinally aligned, and wherein the grooves are substantially semicircular in shape and are dimensioned to form a substantially cylindrical opening between abutting surfaces of the first and second drive belts that grips the optical fiber cable being manufactured in a friction-fit.

6. The torque capstan of claim 5, further comprising a drive system, and wherein the first portion comprises a plurality of idle pulleys, a drive pulley, a driven pulley, and a pneumatic cylinder, the drive pulley being rotationally mounted on a first end of the first portion, the driven pulley being rotationally mounted on a second end of the first portion, the idler pulleys being rotationally mounted on the first portion between the drive pulley and the driven pulley, and wherein the drive pulley is adapted to be coupled to the drive system to enable a speed at which the first belt rotates to be controlled by the drive system, and wherein the drive system controls the speed of the first belt, the motion of the first belt transferring motion to the second belt through said contact between the first and second belts such that the first and second belts rotate at substantially the same speed, and wherein the contact between the belts and the optical fiber cable, in combination with the rotation and motion of the belts, provides an additional force in the direction in which the optical fiber cable is being pulled, and wherein said additional force reduces back-tension asserted on the optical fiber cable during the manufacturing process, said back-tension corresponding to a force in a direction opposite the direction in which the optical fiber cable is being pulled.

7. The torque capstan of claim 6, wherein the second drive belt has a longitudinal groove formed therein, the longitudinal groove formed in the second drive belt being substantially parallel to the direction in which the optical fiber cable is being pulled and configured to grip a portion of the optical fiber cable, the grooves formed in the first and second belts being substantially longitudinally aligned, and wherein the grooves are substantially semicircular in shape and are dimensioned to form a substantially cylindrical opening between abutting surfaces of the first and second drive belts that grips the optical fiber cable being manufactured in a friction-fit.

8. The torque capstan of claim 7, wherein the second portion comprises a plurality of idle pulleys, a first driven pulley, a second driven pulley, and a pneumatic cylinder, the first driven pulley being rotationally mounted on a first end of the second portion, the second driven pulley being rotationally mounted on a second end of the second portion, the idler pulleys of the second portion being rotationally mounted on the second portion between the first driven pulley and the second driven pulley.

9. The apparatus of claim 8, wherein the optical fiber cable is a high fiber count cable (HFC) comprising a plurality of subunit cables, and wherein the grooves provide sufficient grip over the core of the optical fiber cable to help substantially maintain a reverse oscillating lay (ROL) length associated with the subunit cables over a length of the optical fiber cable.

10. The torque capstan of claim 1, wherein the first portion comprises a plurality of idler pulleys, a drive pulley, a driven pulley, and a pneumatic cylinder, and wherein the drive pulley is coupled to a drive system to enable a speed at which the first and second belts rotate to be controlled by the drive system.

11. The torque capstan of claim 1, wherein the second portion comprises a plurality of idler pulleys, a drive pulley, a driven pulley, and a pneumatic cylinder, and wherein the drive pulley is coupled to a drive system to enable a speed at which the first and second belts rotate to be controlled by the drive system.

12. The torque capstan of claim 1, wherein the groove is formed in a layer of high-friction material comprised by the first belt.

13. The torque capstan of claim 1, wherein the first and second drive belts are standard belts having first and second layers, respectively, of high-friction material secured thereto.

14. A method for reducing back-tension on an optical fiber cable during an optical fiber cable manufacturing process, the method comprising the steps of:

receiving subunit cables of an optical fiber cable in a torque capstan after the subunit cables exit a reverse oscillating lay (ROL) machine, the ROL machine processing the subunit cables to provide the optical fiber cable with a ROL length; and applying an additional force in a direction substantially parallel to a direction in which the optical fiber cable is being pulled by a first force during the optical fiber cable manufacturing process, the additional force being applied in a direction substantially opposite to the back-tension, the back-tension corresponding to a force exerted on the optical fiber cable in a direction substantially opposite to the direction in which the optical fiber cable is being pulled by the first force during the optical fiber cable manufacturing process, thereby maintaining the ROL length as the optical fiber cable is pulled through the torque capstan.

15. The method of claim 14, further comprising the steps of:

measuring a remaining force exerted on the optical fiber cable after the optical fiber cable exits the torque capstan, the remaining force corresponding to a vector sum of additional force applied to the optical fiber cable and the force associated with the back-tension; and adjusting the amount of said additional force applied to maintain said remaining force at a substantially constant level.

16. The method of claim 16, wherein the step of measuring the remaining force is performed by a feedback system comprising a sensor that senses the remaining force and converts the sensed force into signals, and wherein the step of adjusting the amount of additional force applied to the optical fiber cable comprises the step of using the signals to control a drive system coupled to the torque capstan to thereby control a speed of the capstan and the amount of additional force applied to the optical fiber cable.

17. A method for reducing back-tension on an optical fiber cable during an optical fiber cable manufacturing process, the method comprising the steps of:

receiving subunit cables of an optical fiber cable in a torque capstan after the subunit cables exit a reverse oscillating lay (ROL) machine, the ROL machine processing the subunit cables to provide the optical fiber cable with a ROL length;

applying an additional force in a direction substantially parallel to a direction in which the optical fiber cable is being pulled during the optical fiber cable manufacturing process, the additional force being applied in a direction substantially opposite to the back-tension, the back-tension corresponding to a force exerted on the optical fiber cable in a direction substantially opposite to the direction in which the optical fiber cable is being pulled during the optical fiber cable manufacturing process;

measuring a remaining force exerted on the optical fiber cable after the optical fiber cable exits the torque capstan, the remaining force corresponding to a vector sum of additional force applied to the optical fiber cable and the force associated with the back-tension;

adjusting the amount of said additional force applied to maintain said remaining force at a substantially constant level; and maintaining the ROL length as the optical fiber cable is pulled through the torque capstan.

18. The method of claim 17, wherein the step of measuring the remaining force is performed by a feedback system comprising a sensor that senses the remaining force and converts the sensed force into signals, and wherein the step of adjusting the amount of additional force applied to the optical fiber cable comprises the step of using the signals to control a drive system coupled to the torque capstan to thereby control a speed of the capstan and the amount of additional force applied to the optical fiber cable.

* * * * *